Nov. 4, 1969     R. K. SUTZ     3,476,332
SPORT FISHING REEL
Filed Dec. 13, 1967     2 Sheets-Sheet 1
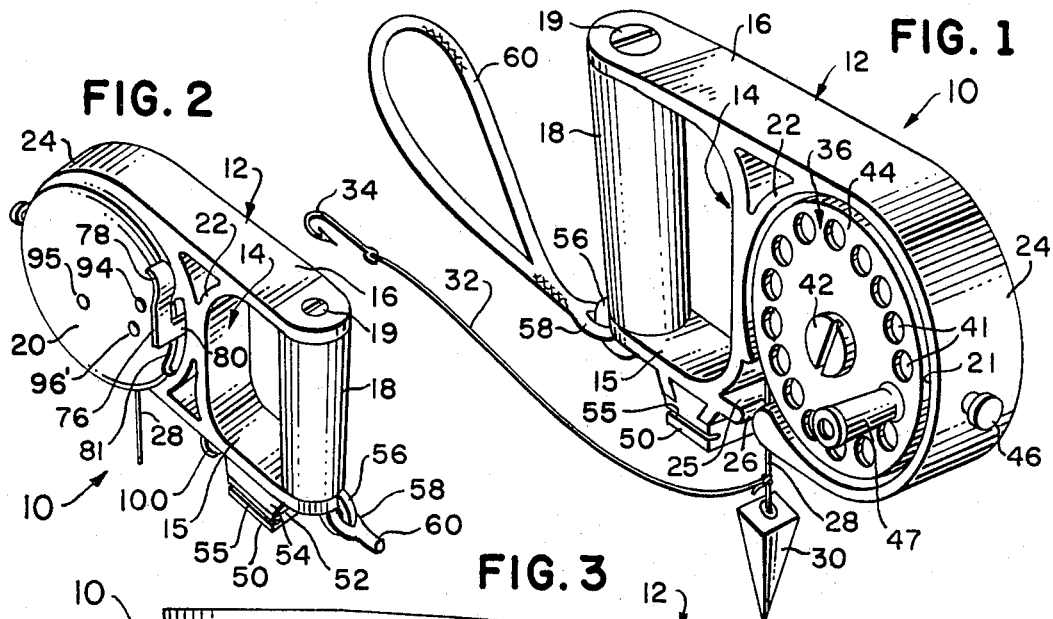
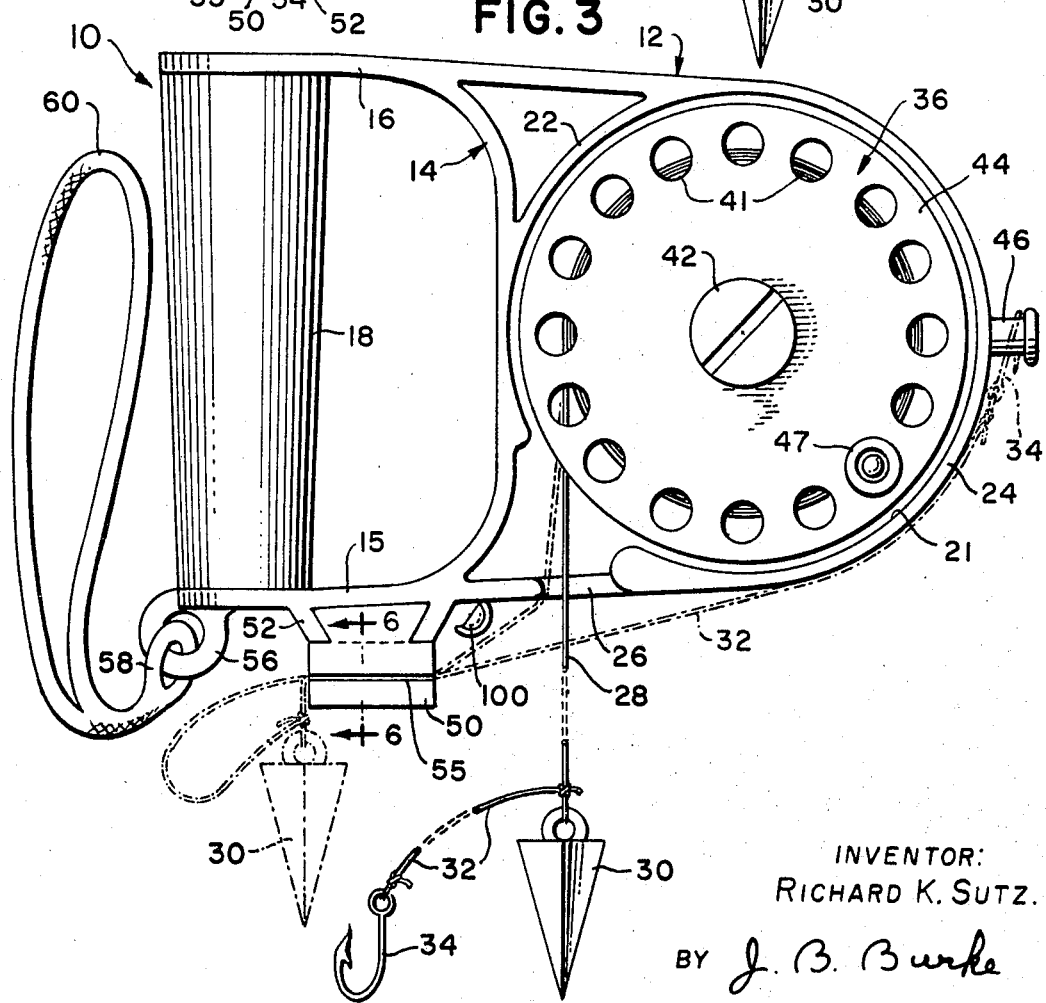
INVENTOR:
RICHARD K. SUTZ.
BY J. B. Burke
ATTORNEY.

Nov. 4, 1969  R. K. SUTZ  3,476,332
SPORT FISHING REEL
Filed Dec. 13, 1967  2 Sheets-Sheet 2
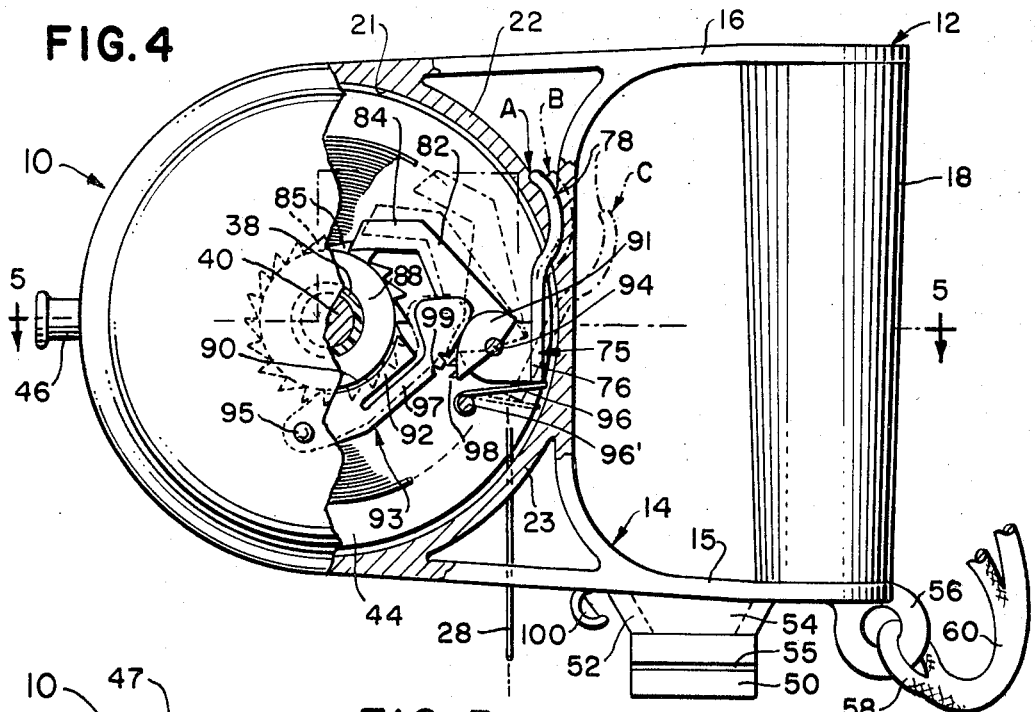
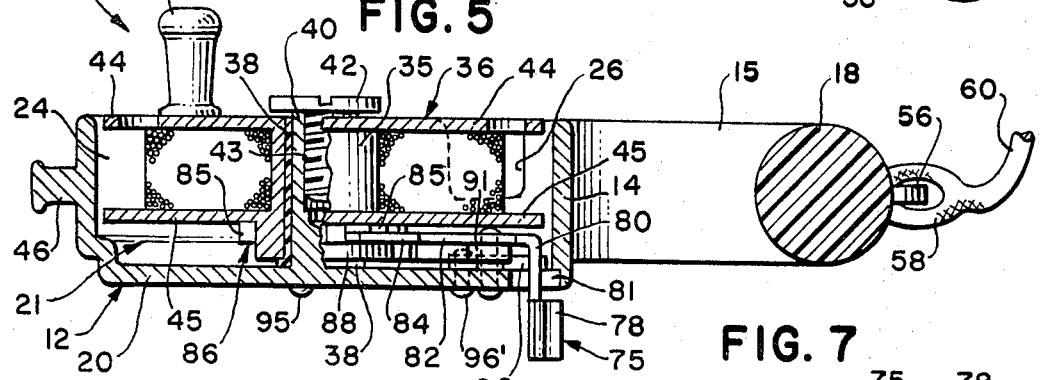
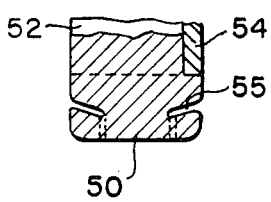
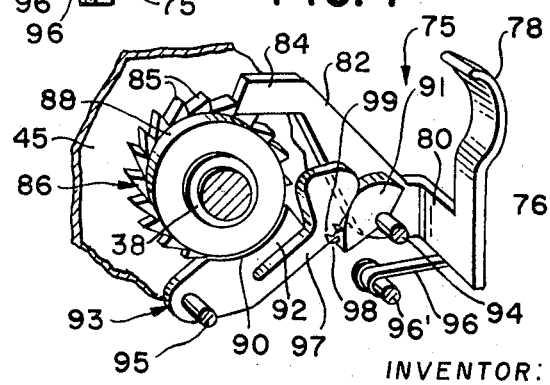
INVENTOR:
RICHARD K. SUTZ.
BY *J. B. Burke*
ATTORNEY.

United States Patent Office

3,476,332
Patented Nov. 4, 1969

3,476,332
SPORT FISHING REEL
Richard K. Sutz, 5800 Arlington Ave.,
Riverdale, N.Y. 10471
Filed Dec. 13, 1967, Ser. No. 690,246
Int. Cl. B65h 17/44
U.S. Cl. 242—99          11 Claims

ABSTRACT OF THE DISCLOSURE

A sport fishing reel having a hand held frame within which is a rotatable spool held by a pawl and ratchet. The pawl-ratchet assembly is finger controlled to release the spool for playing out a line. The finger control simultaneously actuates a cam operated brake and variable drag on the spool to control and vary the rate of playing out of the line from the spool. Means are also provided to maintain a preset drag on the spool by detent means.

---

The invention concerns a fishing reel especially adapted for still fishing. The fishing reel is intended for use by a fisherman while he is physically immersed or entirely submerged in water, suitably attired in snorkling or scuba equipment. The reel can also be used by a fisherman while engaged in still fishing off a boat, pier or bridge.

Sport fishing as generally practiced, involves three common methods: casting, trolling and still fishing. In casting and trolling, a fishing pole is used. Still fishing can be practiced with or without a pole. Heretofore still fishing has been conducted with hand lines alone, or with lines engaged on poles such as used in casting and trolling. None of these prior fishing devices are adapted for use by a fisherman while swimming underwater where casting and trolling cannot be practised.

According to the invention there is provided a reel specifically adapted for a fisherman while underwater. Such a reel must meet several unusual requirements not necessary for overwater fishing. In the first place, the fisherman should be able to see the fish to be caught before the line is played out. He should also be able to see the fish while he is playing out the line, while the fish is taking the hook, and after the fish takes the hook. Secondly, the reel must not interfere with the mobility of the fisherman while he is underwater. Thirdly, the reel must provide fine, instant control for playing out the line, effective braking and holding of the line, and full freedom in reeling in the line.

The present invention meets all the above requirements and in addition provides other desirable features including means for holding the reel when not in use, means for retaining the line and hook on the reel when not in use, and means for cutting the line if it becomes snagged on an obstruction or must be cut instantly for any reason in an emergency.

It is therefore one object of the invention to provide a new fishing reel provided with a one-piece frame and handle and carrying a rotatable spool for a weighted line held against rotation by a ratchet, and further provided with a finger controlled pawl for releasing the ratchet.

A further object is to provide a fishing reel as described with finger controlled braking means for controlling the rate at which the fishing line is played out.

A further object is to provide a fishing reel as described with adjustable and settable drag means for controlling the rate at which the fishing line is played out.

A further object is to provide a fishing reel as described, wherein the braking means includes an eccentric spring biased cam actuating a braking lever against a brake shoe on the spool for frictionally controlling the spool as the line is played out.

A further object is to provide a fishing reel as described wherein the drag means includes detent means settable in any one of a plurality of positions for maintaining a drag of constant magnitude as the line is played out.

Other objects are to provide a fishing reel as described, with a handle forming part of the reel assembly, with a wrist strap for carrying the reel, with a knife for cutting the line, with a slotted block for retaining the line when not in use, and with a stud or post for retaining the fish hook when not in use.

Another object is to provide a sport fishing reel which makes underwater fishing by scuba and snorkel divers and swimmers feasible, safe, and convenient.

The invention will be explained in detail in connection with the drawing, wherein:

FIG. 1 is a perspective view of a still fishing reel embodying the invention, showing one side of the reel.

FIG. 2 is a reduced perspective view of the reel showing the other side thereof, parts of the line and a wrist strap being omitted.

FIG. 3 is an enlarged side view of the reel arranged as in FIG. 1.

FIG. 4 is an enlarged side view of the reel arranged as in FIG. 2 with parts of the reel frame, spool and fishing line broken away.

FIG. 5 is a cross sectional view taken on line 5—5 of FIG. 4.

FIG. 6 is a framentary sectional view of a slotted block for holding the fishing line, taken on line 6—6 of FIG. 3.

FIG. 7 is a fragmentary perspective view of parts of the finger controlled mechanism of the reel.

Referring to the drawing, the reel 10 has a frame 12 formed at one end with a U-shaped portion 14. Between opposite arms 15 and 16 of the frame portion is a handle 18 secured by bolt 19. If desired this handle can be integrally molded or formed with the remainder of the frame so that bolt 19 can be omitted. The other end of the frame is formed with an integral circular side wall 20 forming part of a cup structure. A generally cylindrical cavity 21 is defined in the cup structure by side wall 20, arcuate frame wall sections 22, 23 and cylindrical wall 24. Wall 24 has a flat wall portion 25 integrally joined to frame portion 14. A slot 26 is provided in wall portion 25 through which fishing line 28 passes freely. Fishing line 28 has a weight 30 at its outer end and also a lateral cord 32 to which fish hook 34 is attached. The line is wound on hollow core 35 of a spool 36.

The spool is rotatably disposed in cavity 21. The core 35 is hollow and rotates freely on a stationary self lubricated plastic sleeve liner 38 engaged on transverse stationary shaft 40. Shaft 40 is integral with side wall 20 as clearly shown in FIG. 5. A bolt 42 engaged in a threaded hole 43 in the shaft holds the spool in the reel. The spool has two flat annular side walls 44 and 45 extending radially of the core 35. Wall 44 has circumferentially disposed holes 41. On outer side wall 44 is also a laterally extending handle 47 which can be turned to rotate the spool for winding up the line 28.

A stud 46 extends radially outward of wall 24 of the frame for engaging hook 34 when not in use as indicated by dotted lines in FIG. 3. A plastic block 50 is fitted in dovetailed flanges 52 at the bottom of the reel. This block has a dovetailed head which fits slidably between the flanges 52 and abuts a depending wall portion 54 of the frame. Slots 55 are formed in opposite sides of the block 50; see FIG. 6. The line 28 can be engaged in these slots for retaining the weight 30 close to the frame when not in use. A loop 56 is formed at the outer end of arm 15 for engaging loop 58 of a wrist strap 60. This strap can be engaged on the wrist of the fisherman for carrying the reel when not in use, or it can remain engaged on the fisherman's wrist while he is using the reel to serve as a safety retainer in case the fisherman accidentally releases his grasp on the handle 18.

The reel is provided with a finger controlled mechanism 75 shown in FIGS. 4, 5 and 7. The mechanism includes a lever 76 having a curved fingerpiece 78 which is located outside of side wall 20 and extends upwardly. The fingerpiece is located outside of side wall 20 and extends upwardly. The fingerpiece is integral with a cross bar or pate 80 which extenlds through a slot 81 in the side of the frame. Bar 80 is integral with a flat pawl 82 which extends upwardly in a plane perpendicular to cross bar 80 and to the axis of rotation of the spool. The upper angled end 84 of the pawl engages in teeth 85 of a ratchet 86. The ratchet teeth are inclined clockwise as viewed in FIGS. 4 and 7. The ratchet is prevented from rotating clockwise when the pawl is engaged with the teeth of the ratchet. The ratchet is secured to side wall 45 of the spool and rotates with the spool. Abutted and secured to the outer side of the ratchet is a brake disk 88. The periphery of this disk can be engaged by concave portion 90 of a brake shoe 92. The brake shoe 92 is part of a generally V-shaped braking member 93 which is apically pivoted on a pivot pin 95 engaged in side wall 20 of the frame. Lever 76 pivots on a pin 94 also engaged in the side wall of the frame. A leaf spring 96 engaged on a pin 96' has its free end engaged under the cross bar 80 and tends to bias it for rotation counterclockwise on pin 94 as viewed in FIGS. 4 and 7. An eccentric cam 91 is abutted to pawl 82 and is also secured on pin 94. Its noncircular periphery contacts leg 97 of the braking member 93. This leg can be flexible. A pair of spaced detent teeth 98 are provided on the periphery of the cam 91. These teeth engage in succession in recesses 99 formed in the adjacent edge of leg 97 of braking member 93 when the cam is rotated. A small curved blade 100 is provided for cutting the line 28 when necessary.

In operation of the reel, an underwater fisherman carries the reel on his left arm. The wrist strap is engaged on the wrist of his left hand while he swims around until he sees below him a fish which he desires to catch. Then the fisherman grasps the handle 18 in his left hand, and with his right hand he releases the hook 34 from stud 46. He also releases the end of the fishing line from block 50. The line now hangs down vertically due to the weight 30. Then the fisherman releases the ratchet by retracting fingerpiece 78 with his left forefinger. The line now unwinds and descends freely. If the fisherman retracts the fingerpiece to position A as indicated in FIG. 4, the pawl will be disengaged from the ratchet but the brake will not be actuated. If the fingerpiece is retracted further toward position C, braking pressure will be applied and a drag will be imposed on the spool to retard unwinding of the line. If the fingerpiece is retracted to either of detent positions B or C of the mechanism, then one or the other of detent teeth 98 will engage in its cooperating recess 99 in leg 97 of the braking member 93. Thus leg 92 of the braking member serving as a brake shoe engaged with brake disk 88 with predetermined pressure, and the line unwinds with a fixed drag on the spool. The fingerpiece 78 can be manually released and it will remain in the set detent position B or C.

When the fish hook descends to the desired depth in the water the fisherman will push the fingerpiece forward off the detent position B or C and the spring 96 will return the pawl 82 to engagement with the ratchet. Now unwinding of the line is prevented. If the fish is caught on the line, the fisherman can grasp the handle 47 and turn the spool to wind up the line and reel in the fish.

If the fisherman desires to play out the line further after the fish is caught, but with adjustable drag, he will adjustably retract fingerpiece 78 to apply adjustable braking pressure to the brake disk 88. At detent positions B and C, whichever one he desires, he can set the drag and can then manually release the fingerpiece 78. At any time thereafter he can advance the fingerpiece manually to reengage the ratchet and stop further unwinding of the line. At any time while the pawl is engaged with the ratchet or not, the fisherman can turn the reel with his right hand while holding the reel with his left hand. If reversal of hand functions is desired, the reel can be constructed with spool 36 facing in the opposite direction from that shown in the drawing. Then the fisherman can hold the reel in his right hand and can turn the spool with his left hand.

The reel as described is especially adapted for underwater still fishing while a fisherman is submerged in water. The invention adds a new dimension to sport fishing, since it makes it possible for an underwater fisherman to fish with a hand held reel and line, unencumbered by a fishing pole. The reel described above can of course be used by a fisherman while standing in a boat or on a dock, pier or bridge. This extends the field of utility of the invention.

The parts of the reel can be made from metal or plastic materials. The frame and handle can be a one-piece molding. Various parts of the mechanism can be made of metal or molded of suitable plastic material. The entire reel is light in weight, easy and safe to use and will afford long, trouble-free, useful service. The reel has a relatively simple structure so that it can be made by mass production methods quite economically.

What is claimed is:

1. An apparatus for sport fishing, comprising:
   a generally flat frame having a U-shaped end portion;
   a handle at said end portion of the frame arranged for grasping by one hand of a fisherman;
   a shallow cup structure at the other end of the frame;
   spool means mounted in said cup structure for storing and playing out a line;
   dead-stop means in said cup structure for locking said spool in a fixed nonratating position;
   port means in said cup structure for permitting free fall of line from said spool; and
   finger controlled lever means pivoted in said cup structure for controlling the dead-stop means, said lever means being disposed near the bight of said U-shaped end portion of the frame for actuation by the forefinger of the hand grasping the handle.

2. An apparatus as defined by claim 1, further comprising:
   braking means in said cup structure operatively arranged with said lever means for progressively applying drag to the spool, the drag applying braking means being variable during use by application of variable pressure by the forefinger of the hand grasping the handle;
   said lever means further comprising mechanical means for sequentially retracting the dead-stop means and for actuating said braking means to apply the braking drag.

3. An apparatus as defined by claim 2, wherein said mechanical means includes cam and cam follower means for actuating the braking means.

4. An apparatus as defined by claim 3, further comprising detent means operatively associated with said cam and cam follower means and adapted for mutual engagement to maintain a selected preset drag on said spool.

5. An apparatus for sport fishing, comprising:
   a generally flat frame having a U-shaped end portion;
   a handle at said end portion of the frame arranged for grasping by one hand of a fisherman;
   a shallow cup structure at the other end of the frame;
   spool means mounted in said cup structure for storing and playing out a line;
   dead-stop means in said cup structure for locking said spool in fixed nonrotating position;
   port means in said cup structure for permitting free fall of line from said spool; and
   a control mechanism disposed for actuation by the forefinger of the hand grasping the handle to control the dead-stop means, said dead-stop means comprising:
   a ratchet carried by the spool and rotatable therewith, and
   a spring biased pawl engageable with the ratchet to prevent turning of the spool in one direction to stop playing out of the line, said pawl being disengaged from the ratchet when the mechanism is actuated to permit the spool to turn in the other direction to play out the line.

6. A reel as defined in claim 5, wherein said finger actuated control mechanism further comprises:
   (a) a brake disk carried by and rotatable with the spool and ratchet; and
   (b) a braking member engageable with the brake disk to retard rotation of the spool in said other direction for restricting the playing out of the line while the pawl is held disengaged from the ratchet, said braking member having:
      (1) a cam drive linkage to vary the braking effect of said control mechanism.

7. A reel as defined by claim 6, wherein said cam drive linkage has at least one detent position for holding the braking member engaged with the brake disk to hold a preset braking pressure thereon while the pawl remains retracted from the ratchet and while the control mechanism is manually released, whereby a predetermined drag is imposed on the spool to retard playing out of the line.

8. A reel as defined by claim 6, wherein said mechanism further comprises a slave cam and a brake shoe on said braking member, said brake shoe being applied to the brake disk while the pawl remains disengaged from the ratchet, whereby the drag of the braking member on the spool is manually variable.

9. A reel as defined by claim 8, wherein said cam and braking member include mutually engageable detent means for holding the braking member in engagement with the brake disk at any one of a plurality of detent positions of the cam to apply a predetermined braking pressure to the brake disk, while the pawl remains retracted from the ratchet and while the finger actuated control mechanism is manually released, whereby a predetermined drag is imposed on the spool to retard playing out of the line.

10. A reel apparatus comprising:
   a frame member having a U-shaped end portion;
   a handle at said end portion of the frame;
   a shallow cup structure at the other end of the frame;
   an integral central post in said cup structure;
   a spool removably and rotatably disposed in said cup structure on said post; and
   a finger actuated control mechanism, comprising:
      (1) a lever pivotally carried by said cup structure and having a fingerpiece accessible to an operator while grasping the handle,
      (2) a pawl integral with said lever,
      (3) a ratchet disk and a brake disk arranged to rotate with said spool,
      (4) a leaf spring inside the frame engaged at one end with said lever to bias the pawl into engagement with teeth of the ratchet, and
      (5) a braking member generally V-shaped and apically pivoted to said cup structure, said braking member having a first leg with a brake shoe formed on an arcuate recess thereof shaped to conform with the curvature of the brake disk and having a second leg extending toward said lever, said second leg having a cam follower thereon, and a driving cam carried by said lever and engageable with said cam follower for adjustably applying said brake shoe to the brake disk to retard turning of the spool when the lever is manually displaced against bias of the spring to disengage the pawl from the ratchet.

11. A reel apparatus as defined by claim 10, wherein said driving cam is eccentric with respect to its pivot support, and wherein both said driving cam and said cam follower are provided with cooperating detent means mutually engageable at least at one detent position to impose a preset dragon rotation of the spool and on playing out of the line, while the finger actuated control mechanism is released and the pawl is disengaged from the ratchet.

References Cited

UNITED STATES PATENTS

| | | | |
|---|---|---|---|
| 1,543,489 | 6/1925 | Wilson | 242—96 |
| 2,523,268 | 9/1950 | Atwood et al. | 242—99 |
| 2,574,216 | 11/1951 | Lindgren | 242—99 |
| 2,984,432 | 5/1961 | Clark | 242—84.53 X |

NATHAN L. MINTZ, Primary Examiner